Dec. 20, 1966   K. TURECEK ETAL   3,292,462
WIRE STRIPPING DEVICE
Filed March 17, 1965   2 Sheets-Sheet 1
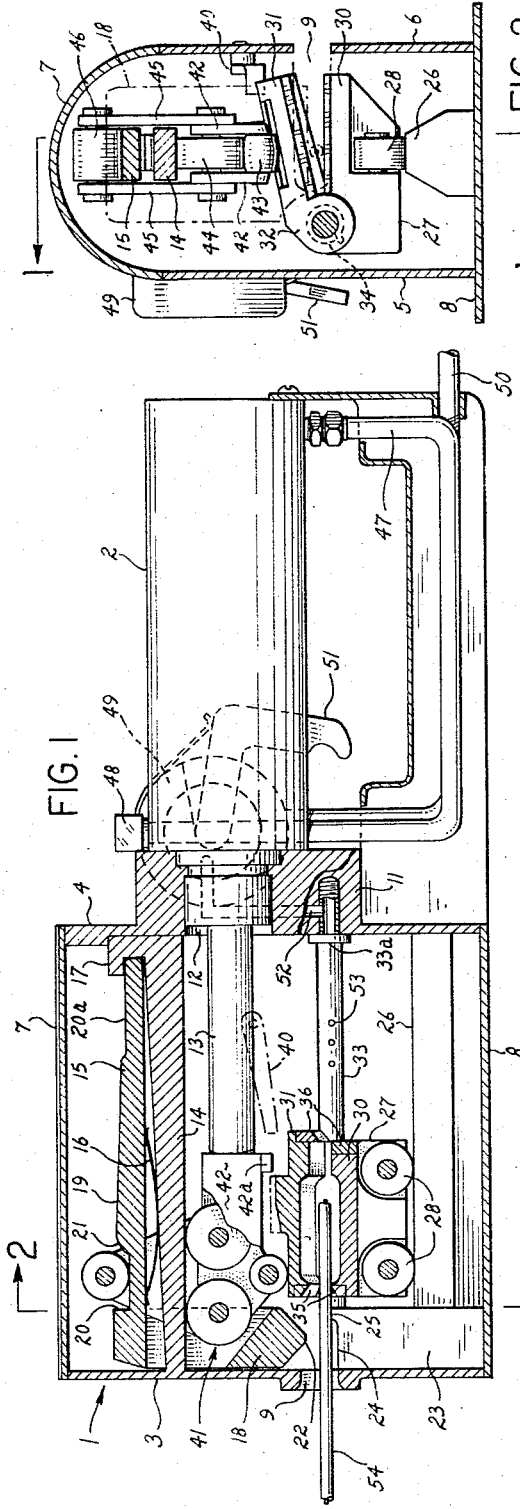
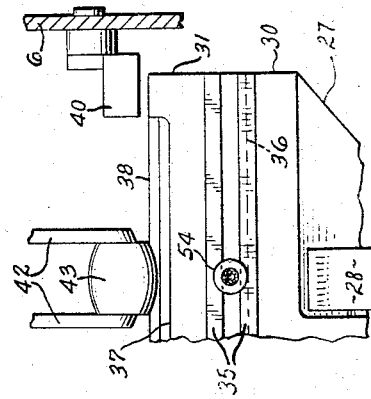
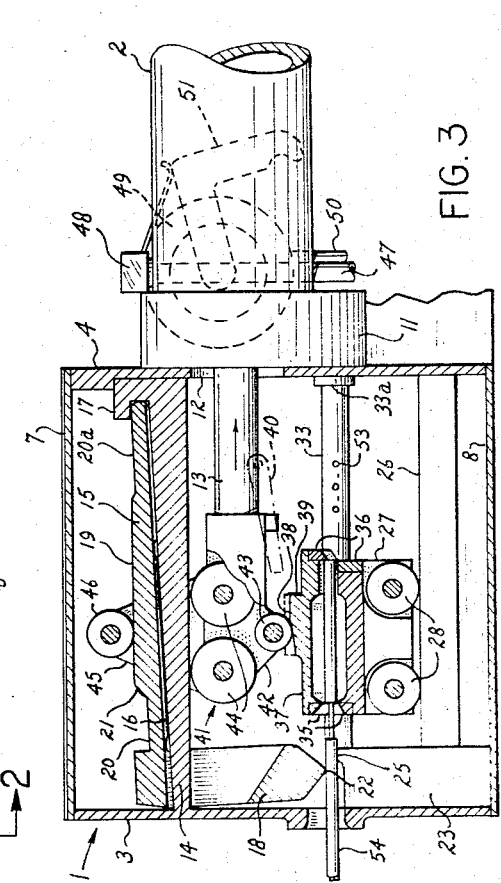
INVENTORS
BRIAN A. EYRES
KVETOSLAV TURECEK
BY: *Westell & Hanley*
ATTORNEYS

INVENTORS
BRIAN A. EYRES
KVETOSLAV TURECEK

BY: *Westell & Hanley*
ATTORNEYS 3,292,462
WIRE STRIPPING DEVICE
Kvetoslav Turecek and Brian Arthur Eyres, Brampton, Ontario, Canada, assignors to Northern Electric Company Limited, Montreal, Quebec, Canada
Filed Mar. 17, 1965, Ser. No. 440,377
12 Claims. (Cl. 81—9.51)

The present invention relates to a device for stripping insulation from the ends of wires.

For the purpose of establishing an electrical connection it is necessary to strip or "skin" insulated wires by removing the insulation adjacent their ends. To facilitate this operation apparatus has been devised which will automatically strip the end of the wire when the wire is inserted into the apparatus. However, such devices are complex in construction, and include a plurality of power units such as air cylinders to motivate the various elements of the device in carrying out the stripping operation. Moreover, the devices are cumbersome and usually have to be mounted on a fixed pedestal. The size and relative immobility of the known devices make them unsuitable for use in stripping wires which are fixed in position. In other words, use of the apparatus is restricted to wires which can be brought to it. To achieve maneuvreability by reducing the scale of the apparatus would sacrifice the power necessary to accomplish the stripping operation.

It is an object of the present invention to provide a stripping device which is simplified in construction and relatively inexpensive to fabricate.

It is another object of the invention to provide a stripping device which is portable and hand-operable, thus enabling it to be brought to the insulated wire, but which at the same time is powerful enough to stirp heavy gauge wire or a multiplicity of wires of lighter gauge.

It is a further object of the invention to provide a stripping device which is actuated by a single motive unit.

Still another object of the invention is to provide a stripping device which includes means to trim the wire being stripped in order to give a uniform length of insulation-stripped wire end.

These objects and advantages are achieved by the provision of a wire-stripping device in which a mechanism, operable as one unit by a single motivating source, actuates clamping means, insulation cutting and stripping means, and preferably also wire trimming means. The motivating source may be a single double-acting air cylinder having a reciprocating piston on which the actuating means is mounted. Preferably the actuating mechanism comprises a pair of cam followers, mounted on the piston, while the clamping means, and the insulation cutting and stripping means, have movable jaws carrying cam surfaces over which the cam followers travel.

Further objects and advantages of the invention will be apparent from the following description of an example embodiment of the invention, to be read in conjunction with the accompanying drawings, in which:

FIGURE 1 is a side view of the device in cross-section taken along the line 1—1 of FIGURE 2 and showing an insulated wire inserted for stripping;

FIGURE 2 is a cross-section taken along the line 2—2 of FIGURE 1;

FIGURE 3 is a view as seen in FIGURE 1 with the device in operation, the wire being clamped and the insulation being stripped from its end portion;

Figure 5A:
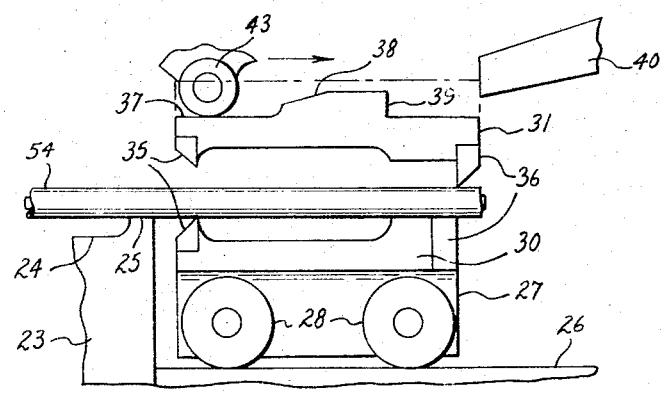
Figure 5B:
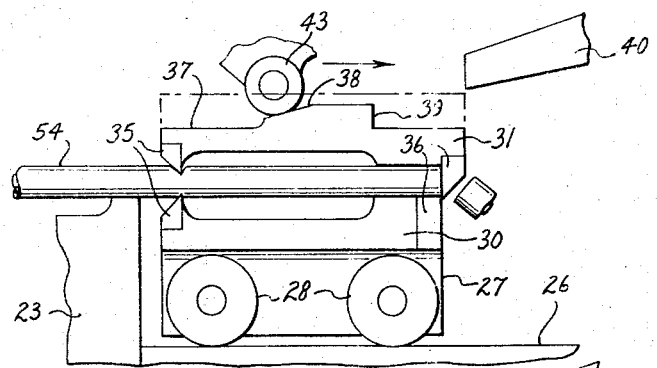
Figure 5C:
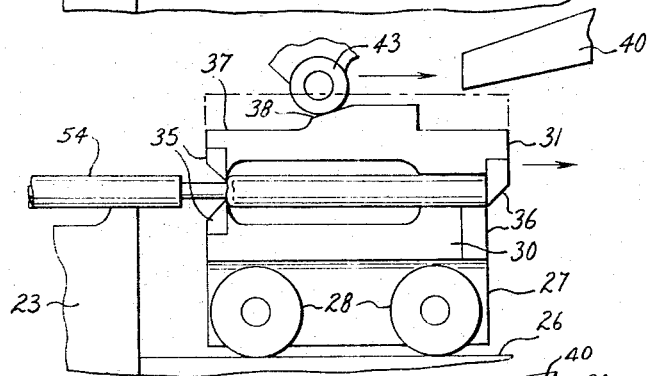
Figure 5D:
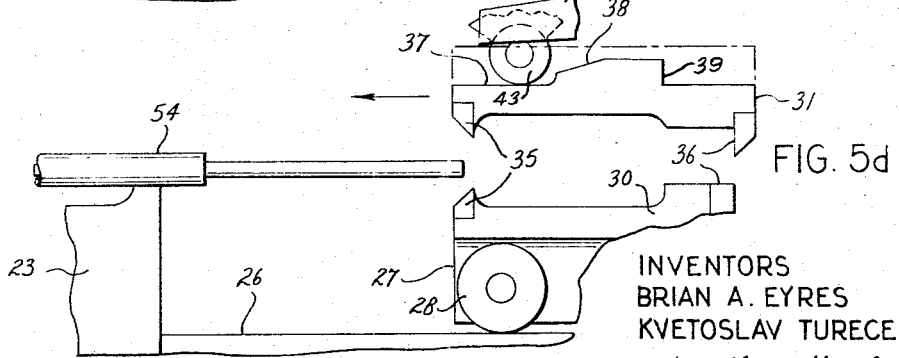

FIGURE 4 is a fragmentary front end view of the carriage jaws with their associated cam follower and restraining pawl; and FIGURES 5a to 5d show the sequence of movement of the jaws and assoiciated carriage in the stripping of the wire, FIGURE 5a showing the carriage at a position of rest with the jaws open to receive the insulated wire, FIGURE 5b showing the jaws closed to cut the insulation and trim the end of the wire, FIGURE 5c showing the carriage with closed jaws moving to strip the insulation from the wire, and FIGURE 5d showing the carriage at the end of its travel and ready to return to its position of rest with its jaws re-opened.

The embodiment shown in the drawings consists of a frame or housing 1 having a double-acting air cylinder 2 mounted on it. Housing 1 is generally rectangular in shape with a front wall 3, a rear wall 4, side walls 5 and 6, a domed top 7, and a base plate 8. An elongated flanged aperture or slot 9 is located in front wall 3 and side wall 6, extending horizontally from a point adjacent side wall 5 to side wall 6 and following side wall 6 its full length to rear wall 4, thus giving both frontal and lateral access to the interior of housing 1. Integral with rear wall 4 is a block 11 on which air cylinder 2 is mounted endwise. An aperture 12 is located in end wall 4 and block 11 through which a piston rod 13, reciprocable in air cylinder 2, projects into housing 1.

The interior of housing 1 carries a fixed beam 14 centrally located lengthwise in the upper portion of the housing. A cam lever arm 15 rests on beam 14 and a leaf spring 16 is interposed between the upper surface of beam 14 and the under surface of lever arm 15. One end of lever 15 is pivoted adjacent the rear end of housing 1 in a recess formed by an overhanging lip 17 integral with beam 14. The forward end of lever 15 adjacent front wall 3 of housing 1 carries a vertically disposed upper movable clamping jaw 18 depending integrally from it. The upper surface of lever arm 15 provides a cam surface 19 which includes a forward depression 20 with a shoulder 21 rising abruptly rearwardly therefrom, and a rearward depression 20a. Jaw 18 circumscribes beam 14 in order to extend below the beam and terminates in a ridge 22 adjacent aperture 9 in front wall 3.

A fixed lower clamping jaw 23 is located below jaw 20, adjacent aperture 9 and against front wall 3. The upper face 24 of lower jaw 23 is flush with the lower surface of aperture 9. Upper face 24 carries a ridge portion 25 remote from aperture 9.

A monorail 26 is fixed centrally on base plate 8 of housing 1 and extends from lower jaw 23 to rear wall 4 of the housing. A carriage 27, having a pair of wheels 28 journalled in its lower portion, travels on rail 26. The upper portion of carriage 27 carries a fixed lower stripping jaw 30 adapted to co-operate with an upper stripping jaw 31 pivotally connected with the carriage along its lateral edge by meshed bushings 32. Carriage 27 retains its position on rail 26 by means of a guide arm 33 which is fixed at one end to rear wall 4 of housing 1 and extends forwardly in the housing to pass through meshed bushings 32. By this construction carriage 27 is able to move along rail 26 supported freely by arm 33 while at the same time upper jaw 31 is able to rotate on arm 33 to open and close with respect to lower jaw 30. Upper jaw 31 is spring biased in an open position by coil spring 34 on guide arm 33. Guide arm 33 carries an abutment block 33a which is positioned flush against rear wall 4.

Jaws 30 and 31 carry two sets of transverse cutting blades, one set of blades 35 being positioned adjacent the front end of carriage 27 and the other set of blades 36 being positioned adjacent the rear end of the carriage. The front set of blades 35 are spaced apart so that they do not meet when upper jaw 31 closes over lower jaw 30. On the other hand the rear set of blades 36 are positioned to slide one over the other when the jaws 30 and 31 come together. The upper surface of upper jaw 31 includes a cam surface 37 which rises in a rearward direction with respect to the carriage to form a shoulder 38 and then levels off, finally dropping abruptly to form an abutment 39.

A pawl 40 is pivoted in housing 1 on side wall 6 and is so located that it abuts against the rear of upper jaw 31 when that jaw is in an open position but clears the upper jaw when it is closed against lower jaw 30. Pawl 40 is spring biased downwardly.

Piston rod 13, projecting into housing 1 from cylinder 2, carries at its free end a multiple cam unit 41. In unit 41 two side flanges 42 are affixed to piston rod 13 and extend forwardly therefrom. Flanges 42 carry a downwardly projecting lug 42a adjacent their rearward ends. A lower cam follower 43 is journalled between flanges 42 adjacent their lower edges. Two guide rollers 44 are journalled in tandem between flanges 42 adjacent their upper edges and are adapted to travel on the under surface of beam 14. A second set of two parallel side flanges 45 are fixed on flanges 42 and extend upwardly about each side of beam 14 and cam lever 15. An upper cam follower 46 is journalled between flanges 45 adjacent their upper ends. When piston rod 13 is fully extended within housing 1 at a position of rest, lower cam follower 43 rests against the forward portion of cam surface 37 on the upper surface of jaw 31 in its fully opened position while upper cam follower 46 rests in depression 20 and restrains cam lever 15 against the action of leaf spring 16.

Air cylinder 2 is fed at one end by a conduit 47 and at the other end by a conduit 48, both leading from a trigger valve 49 which is fed by an air hose 50 from a suitable pressure source. Valve 49 is hand actuated by a trigger 51. A passage 52 in block 11 leads from air cylinder 2 to guide arm 33 which carries a series of outlet ports 53.

In the operation of the described device, the movable elements are at a position of rest when piston rod 13 is fully extended within housing 1. Because upper cam follower 46 rests in depression 20 on lever 15, ridge 22 of jaw 18 is spaced from upper face 24 of fixed lower jaw 23. This allows a wire 54 to be inserted through aperture 9 in front wall 3 of housing 1 and the intervening space between the jaws 18 and 23. Moreover, lower cam follower 43 rests against the forward portion of cam surface 37 of jaw 31 and allows that jaw to maintain a fully opened position. Consequently wire 54 may also pass first between the set of blades 35 and then between blades 36. The relationship of wire 54 and carriage 27 at this stage is shown in FIGURE 5a of the drawings.

When valve 49 is actuated by trigger 51 pressurized air passes from air hose 50 into conduit 48 and thence into air cylinder 2, driving the piston and its associated piston rod 13 to the right (rearwardly) as viewed in the drawings. On movement of rod 13 upper cam follower 46 rides up on shoulder 21 of cam surface 19, thus forcing upper jaw 18 downward against the action of spring 16 and clamping wire 54 against upper surface 24 of lower jaw 23. Ridge portion 25 bearing against wire 54 enhances the gripping action between upper jaw 20 and lower jaw 23.

As rod 13 moves to the right lower cam follower 43 travels along cam surface 37 on upper jaw 31. In the position of rest of carriage 27 adjacent lower jaw 23, shoulder 38 of cam surface 37 is displaced to the right in its location with respect to shoulder 21 of cam surface 19 on lever 15 so that lower cam follower 43 does not reach shoulder 38 until upper cam follower 46 has completed its travel over shoulder 21 and wire 54 is firmly clamped in position. As lower cam follower 43 travels to the right under the action of piston rod 13 the follower will climb shoulder 38 on cam surface 37 of upper jaw 31. Since cam unit 41 is not flexible in a direction transverse to the axis of piston rod 13, upper jaw 31 will be forced downward against the action of coil spring 34, closing blades 35 to sever the insulation on wire 54 and also closing blades 36 to trim the wire by severing its extreme end portion. This sequence in the operation is illustrated in FIGURE 5b of the drawings.

When upper jaw 31 is depressed by lower cam follower 43 it clears pawl 40 and further rightward movement of follower 43 results in rearward movement of carriage 27. This in turn causes blades 35, which have cut the insulation of wire 54, to push the severed portion of insulation to the right and off the wire. Of course the force applied by piston rod 13 must be sufficient to maintain jaws 30 and 31 locked together and pull the severed portion of insulation from the end of the wire. This step is illustrated in FIGURE 5c of the drawings.

It should be noted that guide rollers 44 travelling along the lower surface of beam 14 maintain followers 43 and 46 in a fixed horizontal track and prevent them from moving either way in a lateral direction with respect to the axis of movement of piston rod 13 (the longitudinal axis of the rod).

The length of travel of piston rod 13, and the length of monorail 26, is such that carriage 27 can travel rearwardly a distance at least equal to its own length. Consequently the severed portion of insulation will be stripped completely from wire 54. At that point cam follower 46 rolls into rearward depression 20a permitting spring 16 to lift cam lever arm 15 and separate upper jaw 18 from fixed lower jaw 23. This action releases the grip on wire 54 and provides sufficient clearance for its removal. After wire 54 is released, i.e. after cam unit 41 has moved rearwardly to a point where cam follower 46 has dropped into depression 20a, piston rod 13 reaches the end of its stroke causing multiple cam unit 41 to stop abruptly. Carriage 27, being unrestrained, continues in motion to the right because of its momentum generated by the action of lower cam follower 43 on cam surface 37 during the rearward stroke of piston rod 13. The motion of carriage 27 is subsequently arrested by contact of jaw 31 against abutment block 33a of arm 33. During this continued rearward motion of carriage 27 cam 37 continues to the right with respect to cam follower 43 and coil spring 34 separates jaws 31 and 30 to the fully open position, as shown in FIGURE 5d of the drawings. Pawl 40 which is spring biased in a downward direction is forced upward by the forward edge of upper jaw 31.

The operation is completed by the return movement of piston rod 13 actuated by the piston in double-acting air cylinder 2. The air exhausted from the left hand side of air cylinder 2 is allowed to pass through passage 52 and out into the space within housing 1 through ports 53 in guide arm 33. The exhaust of air from ports 53 blows the severed insulation out from the housing. On the return of piston rod 13, lug 42a integral with multiple cam unit 41 contacts abutment 39 of upper jaw 31 so that carriage 27 is returned to the rest position with unit 41. Of course, if wire 54 is fixed then the stripping device is moved away from the wire. It should be noted that during this rearward motion of carriage 27 the relationship between carriage 27 and multiple cam unit 41 is such that cam follower 43 never leaves upper portion of cam surface 38.

We claim:

1. A device for stripping a length of insulation from the end portion of an insulated wire, comprising: means to clamp the wire at a point spaced from its end, said clamping means having a fixed clamping jaw and a movable clamping jaw, said movable clamping jaw having a first cam surface associated therewith; means movable to strip length of insulation from the end of the wire, said movable stripping means having a pair of stripping jaws operable in a plane transverse to the axis of the wire when clamped and a pair of insulation-cutting blades mounted on said stripping jaws, said stripping jaws being mounted on a movable carriage, one of said stripping jaws being pivotal on the carriage and having a second cam surface associated therewith; and means to actuate the clamping means and the stripping means to close the clamping jaws to clamp the wire against movement, close the stripping jaws to cut the insulation of the wire, move the stripping jaws along the axis of the wire to strip the severed insulation therefrom, open the clamping jaws to release the end-stripped wire, open the stripping jaws, and return the stripping jaws to their original position of rest, said actuating means including a first cam followed adapted to travel on the first cam surface and a second cam follower adapted to travel on the second cam surface, and means to move said two cam followers in unison.

2. A device as claimed in claim 1 in which the means to move the cam followers comprises a fluid actuated cylinder and piston assembly having a rod reciprocable in a direction parallel to the axis of the wire when clamped.

3. A device for stripping a length of insulation from the end portion of an insulated wire, comprising: means to clamp the wire at a point spaced from its end; means movable to strip a length of insulation from the end of the wire, said movable stripping means having a pair of jaws operable in a plane transverse to the axis of the wire when clamped and a pair of insulation-cutting blades mounted on said jaws; and means to actuate the clamping means and the stripping means to clamp the wire against movement, close the jaws to cut the insulation of the wire, move the jaws along the axis of the wire to strip the severed insulation therefrom, open the clamping means to release the end-stripped wire, open the jaws, and return the jaws to their original position of rest, said actuating means comprising a rod reciprocable in a direction parallel to the axis of the clamped wire, said rod carrying two cam followers thereon engageable with cam surfaces associated with said clamping means and said jaws respectively, said rod also carrying means engageable with said jaws to return them to their original position of rest.

4. A device as claimed in claim 3 in which a double-acting air cylinder and piston assembly reciprocates said rod.

5. A device for stripping insulation from the end portion of an insulated wire, comprising: a frame having front, rear and side portions and a base; actuating means mounted rearwardly on the frame and having a reciprocally movable rod extending forwardly therefrom; clamping means having a fixed jaw and a movable jaw, said movable clamping jaw having a cam surface and being resiliently biased in an open position; a carriage movable on the base of the frame in a direction along the axis of the rod, said carriage carrying a pair of stripping jaws, one of said stripping jaws being movable and resiliently biased in an open position, said stripping jaws carrying a forward pair of blades adapted to cut the insulation of the end portion of a wire inserted between said stripping jaws and a rearward pair of blades adapted to sever said wire, said movable stripping jaw having a cam surface; said rod carrying a first cam follower engaging the cam surface of the movable clamping jaw of the clamping member and a second cam follower engaging the cam surface of the movable stripping jaw of the carriage, the cam surfaces of the movable clamping jaw and of the movable stripping jaw being configured such that on insertion of a wire between said stripping jaws and actuation of the actuating means the rearward movement of the rod will (a) close the clamping jaws on the wire, (b) close the stripping jaws about the wire to cut the insulation at a point spaced from the end thereof and to trim the end of the wire, (c) move the carriage rearwardly in the frame to strip the cut insulation from the wire, and (d) open the clamping jaws to release the end-stripped wire; and means fixed on the rod to return the carriage to its position of rest on forward movement of the rod.

6. A device as claimed in claim 5 in which the movable clamping jaw comprises a lever arm and a transversely disposed jaw portion, the lever arm having a cam surface parallel with the rod, said cam surface including a forward depression and a rearward depression.

7. A device as claimed in claim 5 in which the cam surface on the movable stripping jaw is parallel with the rod and comprises a flat forward portion rising rearwardly in an upwardly sloping shoulder.

8. A device as claimed in claim 6 including a pawl pivotally mounted on one side wall of the frame engaging the movable stripping jaw in its open position to restrain rearward movement of the carriage until the movable stripping jaw is depressed by said second cam follower on rearward movement of said rod.

9. A device as claimed in claim 6 in which the cam surface on the movable stripping jaw is parallel with the rod and comprises a flat forward portion rising rearwardly in an upwardly sloping shoulder, the shoulder of the cam surface on the movable stripping jaw being positioned rearward of the forward depression of the cam surface on the lever arm of the clamping jaw when the carriage is in its forward position of rest.

10. A device as claimed in claim 5 in which the means to return the carriage to its original position of rest comprises a lug on the rod engageable with an edge portion of the movable stripping jaw.

11. A device for stripping insulation from the end portion of an insulated wire, comprising; a housing having front, rear and side walls and a base; a fluid actuated cylinder and piston assembly mounted on the rear wall of the housing and having a reciprocable piston rod extending forwardly within the housing; an aperture in the front wall of the housing adapted to receive the end portion of a wire; a clamping member adjacent the aperture, said clamping member having a fixed jaw and a movable jaw, said movable jaw having a cam surface and being spring biased in an open position; a track disposed in the housing parallel to the piston rod; a carriage movable along the track, said carriage carrying a pair of jaws having one jaw movable and spring biased in an open position, said pair of jaws carrying a forward pair of blades adapted to cut the insulation of the end portion of a wire inserted in said aperture and a rearward pair of blades adapted to sever said wire, said movable jaw having a cam surface; said piston rod carrying a first cam follower engaging the cam surface of the movable jaw of the clamping member and a second cam follower engaging the cam surface of the movable jaw of the carriage, the cam surfaces of the clamping member and of the movable jaw of the carriage being configured such that on insertion of a wire in said aperture and actuation of the cylinder and piston assembly the rearward movement of the rod will (a) close the clamping member on the wire, (b) close the jaws of the carriage about the wire to cut the insulation at a point spaced from the end thereof and to trim the end of the wire, (c) move the carriage rearwardly in the housing to strip the cut insulation from the wire, and (d) open the clamping member to release the end-stripped wire; and means fixed on the piston rod to return the carriage to its position of rest on forward movement thereof.

12. A device as claimed in claim 11 in which the fluid actuated cylinder is a double-acting air cylinder and including means to exhaust air into the housing on the forward stroke of the piston to eject the stripped insulation therefrom.

References Cited by the Examiner

UNITED STATES PATENTS

| 2,880,635 | 4/1959 | Harris | 81—9.51 |
| 2,886,995 | 5/1959 | Bach et al. | 81—9.51 |
| 3,002,408 | 10/1961 | Schwalm et al. | 81—9.51 |
| 3,199,383 | 8/1965 | Gudmestad | 81—5.51 |
| 3,222,957 | 12/1965 | Kramer et al. | 81—9.51 |

WILLIAM FELDMAN, *Primary Examiner.*

MILTON S. MEHR, *Examiner.*